US012599835B2

(12) United States Patent
Quiros

(10) Patent No.: US 12,599,835 B2
(45) Date of Patent: Apr. 14, 2026

(54) WEARABLE CONTROLLER

(71) Applicant: Sony Interactive Entertainment Inc., Tokyo (JP)

(72) Inventor: Estefania Rodriguez Quiros, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 295 days.

(21) Appl. No.: 17/954,590

(22) Filed: Sep. 28, 2022

(65) Prior Publication Data

US 2023/0110139 A1 Apr. 13, 2023

(30) Foreign Application Priority Data

Oct. 5, 2021 (GB) ..................................... 2114267

(51) Int. Cl.
| *A63F 13/212* | (2014.01) |
| *A63F 13/211* | (2014.01) |
| *A63F 13/214* | (2014.01) |
| *G06F 3/01* | (2006.01) |

(52) U.S. Cl.
CPC .......... *A63F 13/212* (2014.09); *A63F 13/211* (2014.09); *A63F 13/214* (2014.09); *G06F 3/011* (2013.01); *G06F 3/014* (2013.01); *A63F 2300/1012* (2013.01); *A63F 2300/105* (2013.01); *A63F 2300/1068* (2013.01)

(58) Field of Classification Search
CPC .... A63F 13/212; A63F 13/211; A63F 13/214; A63F 2300/1012; A63F 2300/105; A63F 2300/1068; G06F 3/014; G06F 3/011
See application file for complete search history.

(56) References Cited

U.S. PATENT DOCUMENTS

| 6,141,643 | A | * | 10/2000 | Harmon | .................. | G10L 21/06 |
| | | | | | | 340/407.1 |
| 9,282,893 | B2 | | 3/2016 | Longinotti-Buitoni | | |
| 11,360,564 | B1 | * | 6/2022 | Shin | ........................ | G06F 3/016 |
| 2011/0105231 | A1 | | 5/2011 | Ambinder | | |
| 2014/0070957 | A1 | | 3/2014 | Longinotti-Buitoni | | |
| 2015/0234479 | A1 | | 8/2015 | Schantz | | |
| 2016/0054797 | A1 | * | 2/2016 | Tokubo | ................. | G06F 3/0346 |
| | | | | | | 345/633 |
| 2019/0004610 | A1 | * | 1/2019 | Meagher | ............... | G06F 3/0383 |

(Continued)

FOREIGN PATENT DOCUMENTS

| EP | | 2895050 | A1 | * | 7/2015 | ......... A41D 13/1281 |
| EP | | 3909558 | A1 | | 11/2021 | |
| KR | 20190036167 | A | | | 4/2019 | |

OTHER PUBLICATIONS

English Translation of CN 208909168 (Year: 2019).*

(Continued)

*Primary Examiner* — Patrick N Edouard
*Assistant Examiner* — Eboni N Giles
(74) *Attorney, Agent, or Firm* — Fish & Richardson P.C.

(57) ABSTRACT

A wearable controller for video games includes: a garment; contact pads detachably secured to the garment via connectors; and a programmable central controller circuit. The contact pads are connected to the central controller circuit and are operable to generate input signals in response to user action.

18 Claims, 4 Drawing Sheets

(56)        References Cited

U.S. PATENT DOCUMENTS

2021/0081042 A1*   3/2021  Baier ..................... G06F 3/014
2022/0244790 A1*   8/2022  Sáenz Löbsack ....... G06F 3/017

OTHER PUBLICATIONS

Extended European Search Report for corresponding EP Application No. 22198366.1, 10 pages, dated Feb. 1, 2023.
Combined Search and Examination Report for corresponding GB Application No. 2114267.4, 7 pages, dated Mar. 31, 2022.

* cited by examiner

WEARABLE CONTROLLER

BACKGROUND OF THE INVENTION

Field of the Invention

The present invention relates to devices and systems for providing control input, and in particular wearable devices and systems for providing control input for video game environments.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Highly realistic video games have become popular with consumers in recent years, which provide a vast quantity and variety of interactable content to the player. The content can be navigated by the player using a controller device, which often has multiple buttons which can be operated by the user to provide electronic input into the video game environment. Such devices are normally controller pads which incorporate buttons in a more-or-less standardised pattern and grips by which the user normally holds the pad in their hands. In addition to video game controls, controller pads are also used for many kinds of electronic input, such as for controlling robotics, surgical devices, remotely controlled (RC) vehicles and drones.

Recent advancements in graphics processing and game design have led to a vast range of highly realistic and immersive content that can be accessed by the player. However, the need to use controller pads for input detracts from the immersive experience and requires players to sometimes look away from the video game at the controller to find the correct button. When used in "real-world" applications such as for controlling surgical devices or remotely-operated vehicles, such unintuitive controls can have potentially devastating effects. Furthermore, due to the ever-increasing number of functions available to (and in some cases, required of) the user in modern games, people with disabilities and reduced dexterity are often unable to play such games using traditional controller pads. Although accessible controller solutions are currently available, it is at present extremely difficult to provide an accessibility controller that is comfortable to every user, particularly because each disability is different and presents different physical restrictions on the user's movement and dexterity.

There is, therefore, a need for a controller device which can provide accurate and immersive control for all users, particularly for users having reduced mobility and dexterity.

The present invention seeks to mitigate at least some of the above problems.

SUMMARY OF THE INVENTION

According to an aspect of the disclosure, there is provided a wearable controller for video games, the controller comprising: a garment; contact pads detachably secured to the garment via connectors; a programmable central controller circuit, wherein the contact pads are connected to the central controller circuit, and are operable to generate input signals in response to user action.

A user may configure the controller by releasing the contact pad from the garment and re-positioning the contact pad to another location on the garment to suit their physical requirements. By having contact pads which are detachably secured to the garment via connectors, it is possible to provide a wearable controller device which can be adjusted to the user's needs and preferences. Such a controller can be adjusted to each user so as to provide maximum comfort and usability. Importantly, this solution allows people with reduced mobility and/or dexterity to tailor the controller in a configuration that is most accessible to them.

The garment may be any item wearable on the body such as clothing, accessories, footwear, or medical devices such as casts, braces and orthoses. Typically, the garment may be made of fabrics, textiles, leather or synthetic materials.

In one particularly advantageous example, the garment may be a glove. The glove may be configured for fitment over the hand (or at the extremity of an arm or limb) of the user. Although the term 'glove' may be used to cover many different kinds of garment for use over the hand, a glove may typically comprise a palm portion and at least one finger portion. Such a garment is easily worn by the user and provides an intuitive interface for user control. Each finger portion may be suitable for housing one or more fingers—for example, in the case of a mitten, there may be one or more large finger portions positioned to surround one or more fingers. The finger portions may completely surround and encase each finger (or set of fingers), or alternatively they may be arranged to cover only a portion of each finger (or set of fingers), leaving a part exposed through an opening at the tips of each finger portion to provide a so-called fingerless glove. Where the garment is a glove, the controller circuit may be positioned on the palm portion. More specifically, the controller may be positioned on the palm position at a location which would be on the back of the hand when the glove is worn by the user. The palm region is typically where there is most space available for placement of a circuit, and this configuration is particularly useful when, as described with respect to some examples herein, the circuit comprises an accelerometer to measure motion/orientation/gestures of the hand as the user can easily see and control the orientation of the palm.

The contact pads may be held in position with respect to the garment by the connectors. The attachment provided by the connector should be secure but reversible, such that the user can easily remove and relocate the contact pads without excessive force, but once re-positioned the pads should be firmly held in place. In other words, the attachment may be temporary. Each connector in the wearable controller may be of the same kind, or alternatively the glove may incorporate multiple different kinds of connectors. Typically, the connector may comprise two complementary parts, one on the contact pad side and one on the garment side.

The connector may comprise a hook-and-loop fastener such as Velcro™. Such a connector may consist of a first fabric strip on the underside of a contact pad and a second fabric strip on the garment side. The first and second fabric strips may be complementary (for example, with tiny hooks and loops on each respective strip) so as to provide, in contact, a temporary binding between the two. In some examples, the second fabric strips on the garment side may be limited in size and location so as to encourage placement of the contact pads in certain locations along the garment. In some examples, the garment itself may be made of a fabric which provides hook-and-loop characteristics; for example a glove made of a fabric having microscopic loops (or hooks) to which a contact pad bearing an under-surface with complementary hooks (or loops) can be attached. A garment entirely made of one component of a hook-and-loop connection has the advantage that the contact pads can be placed anywhere, and in any orientation, across the garment.

In some examples, some, or all, of the connectors may comprise a snap fastener or button connection (also known as press stud, dome fastener, popper, snap-fit or tich). In such cases, the garment may comprise one or more first connecting components (such as a groove component) and the contact pads may comprise one or more second connecting components (such as a lipped protrusion) arranged to snap into the first connecting components and provide a reversible fastening.

In some examples, the connectors may comprise one or more magnetic components. One or more magnets (or magnetically receptive materials such as iron) may be located on the garment, configured to interact with a corresponding magnet or magnetically receptive material on the contact pads.

In some examples, each connector can comprise multiple different kinds of means for providing fastening; for example, each connection may comprise a mixture of both Velcro™ and snap-fit fastener. The connectors may be part of, or embedded in, the garment.

Whilst the connectors have a primary purpose of providing reversible fixture of the contact pad to the garment, some or all of the connectors may also provide electrical connection between the contact pads and various components. The electrical connection may typically be between some or all of the contact pads to the controller circuit. In some examples, there may also (or alternatively) be connections between some of the contact pads themselves. The means by which the connectors provide physical and electrical connection may be the same. For example, in the case of a connector comprising hook-and-loop fasteners such as Velcro™, the hook-and-loop elements may comprise an electrically conductive fabric. Likewise, in the case of a snap-fit connector, the connector may comprise an electrically conductive element. The connector may comprise a shielding designed such that the electrically conductive element is shielded from its external surface, so as to prevent short circuiting or accidental electrical shocks to the user.

The contact pads are used for providing a means of input for the user. They can be of any form suitable for a user to selectively generate a signal from their actions to the controller circuit. For example the contact pads may comprise a simple switch mechanism which can be turned on and off to generate pulse signals to act as input. The contact pads may comprise a conductive fabric. The conductive fabric in the contact pads may be connected to the central controller circuit, or other component of a circuit positioned on the device. An input signal may be generated when a contact pad, bearing a conductive element such as conductive fabric, comes into contact with another conductive component (such as another contact pad) connected to the controller circuit thereby completing the circuit. In some examples, the contact pads may comprise a physical click switch that can be depressed by the user to generate a signal. Other examples include a capacitive or a resistive sensor. In some examples the contact pads may combine two or more such techniques such as a conductive and click switch.

The controller may comprise an activation pad for activating each contact pad. Each of the contact pads on the controller may be configured such that a signal is registered or generated only when the contact pad comes into contact (or interacts) with the activation pad. The controller may comprise multiple such activation pads. In some examples, the contact pads may be selectively configurable such that the user can choose one or more of the contact pads to act as the activation pad. In some examples, certain contact pads may be configured to register an input only when they come into contact (or interact with) specific activation pads. For example, a controller comprising contact pads A, B, and C may comprise activation pads X and Y; the pads A and B may only generate input signal when contact is made with activation pad X and not Y, and pad C may only generate input signal when contact is made with activation pad Y and not X. Hence it will be appreciated that the controller may comprise one or more activation pads, and an activation pad may be arranged to activate one or more contact pads. Configurations may be stored on a memory on the central controller circuit, for example as selectable profiles. Combined with the ability to place the various contact and activation pads in any desired location on the garment, the ability to selectively control the input generating combinations of such pads provides further freedom for customisation and ultimately improved accessibility for use, and can also serve to avoid unwanted input activation combinations. One or more of the activation pads or contact pads may also be configured for placement off of the garment, such that a user can place the pad on a table for example. In such cases the pad may comprise feet, or an adhesive or friction element for secure placement on a surface. Similarly pads may also be configured for placement on other items of clothing, either exploiting natural loops in their fabric or existing snap-fit fasteners, or being provided with or being detachable connectable to clips, pins, or straps for the purpose. Electrical connectivity to off-garment pads may be provided by wired means similar to those of the on-garment pads, or by wireless means such as near-field communication (e.g. Bluetooth™) or Wi-Fi.

The contact pads may comprise resistive or capacitive touch pads which activate when physically depressed. The touch pads may be located on the contact pads and/or the activation pads. The contact pads may also employ other means of input such as proximity and motion sensors.

The controller circuit itself may be detachably secured to the garment via one or more connectors. The connectors may be any one or more of the connectors described above with respect to the contact pad connections. In this way, the position of the controller circuit can also be chosen and adjusted by the user, for example to occupy a wristwatch position, optionally in conjunction with a wrist strap for the purpose. The controller circuit may be on a single printed circuit board or distributed across multiple boards.

The controller may comprise an accelerometer connected to the central controller circuit. Such an accelerometer may typically register gestures made by the user, including for example motion, tilt, and/or rotation. When registering motion, the accelerometer may detect translation and optionally rotation in up to three axes, for example detecting left, right, up, down movements of the controller and/or the user. The accelerometer may be a separate unit that is connected to the controller circuit, or it may be integrated within the controller circuit. For example, the controller may further comprise one or more accelerometer pads. Such accelerometer pads may be similar in shape and configuration to the contact pads, except that they provide accelerometer input, and may be detachably secured to the garment via connectors. In some examples, a contact pad may comprise touch-input generating components as well as accelerometer components. In some examples, accelerometer pads may be placed on a remote position or a second garment. In some examples, the accelerometer pad may be configured for placement on the user's body via an attachment. For example, the attachment may comprise a strap, or adhesive tape for placement on the user's body. Such accelerometer pads may be connected to the central controller circuit by similar means to the contact pads or additionally by wireless technology such as Bluetooth™. An accelerometer provides a simple and efficient way of registering the user's motion, such that the user can operate input by simple and intuitive gestures such as flicking the hand, rotating or shaking.

The contact pads may be connected to the controller circuit by conductive threads.

The garment itself may comprise means for electrically connecting various components of the controller. For example, the garment may comprise at least one conductive channel on (or accessible at) its surface. Such a conductive channel may be configured to connect, in use, the central controller circuit with the conductive pads. The conductive channel may be embedded in the garment, and may also form part of a garment-side circuit. The conductive channels may comprise conductive thread embedded in the garment.

The garment may comprise multiple parts. In some examples, the controller may comprise a second garment.

In some instances, a user may wish to use their own pre-existing garment as a controller. The contact pads, connectors and central controller circuit described above— utilising any one or more of the optional features described herein—may be provided as a kit of parts to be installed on a garment. In other words, an aspect of the disclosure provides a kit of parts consisting of contact pads connected to a central controller circuit and connectors for detachably securing the contact pads to a garment. Such a kit of parts may be installed on a pre-existing garment such that the controller can be retrofitted to any desired appropriate garment.

The controller may be distributed across two or more garments. That is, the controller may further comprise a second garment. One or more secondary contact pads may be detachably secured to the second garment via connectors. The secondary contact pads may be connected to the central controller circuit and operable to generate input signals in response to user action. The secondary contact pads may connect to the central controller circuit by wired or wireless connection. The secondary contact pads may be configured to operate in one or more of the manners described above with respect to the other contact pads.

According to another aspect of the present disclosure, there is also provided a system of wearable controllers, the system comprising one or more of the controllers described above, each of the controllers in communication with each other via wired or wireless communication.

It will be appreciated that any one or combination of the features described with respect to each aspect of the disclosure may be adapted and/or applied to another of the aspects described herein, with their associated effects and advantages.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
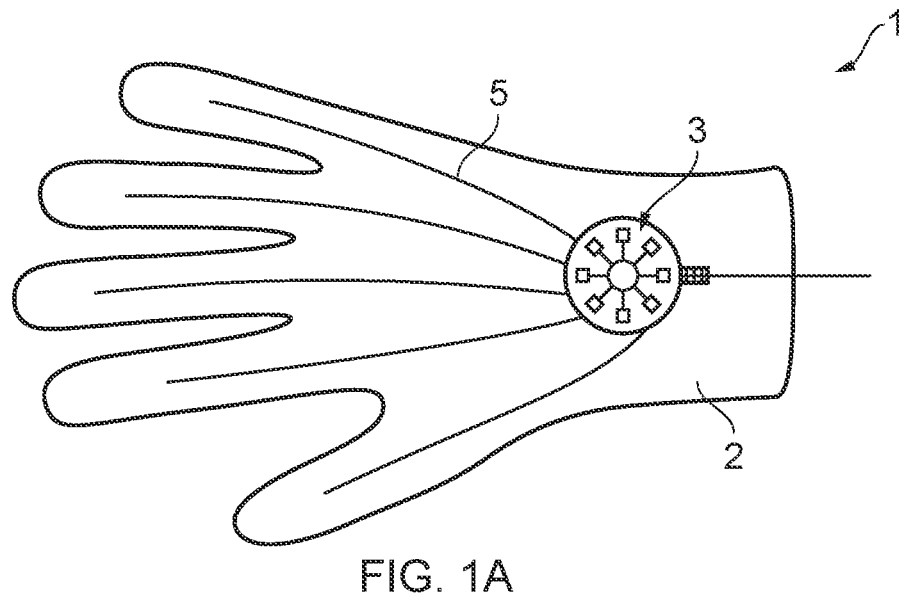
FIG. 1A schematically illustrates an example wearable controller in an assembled configuration.
Figure 1B:
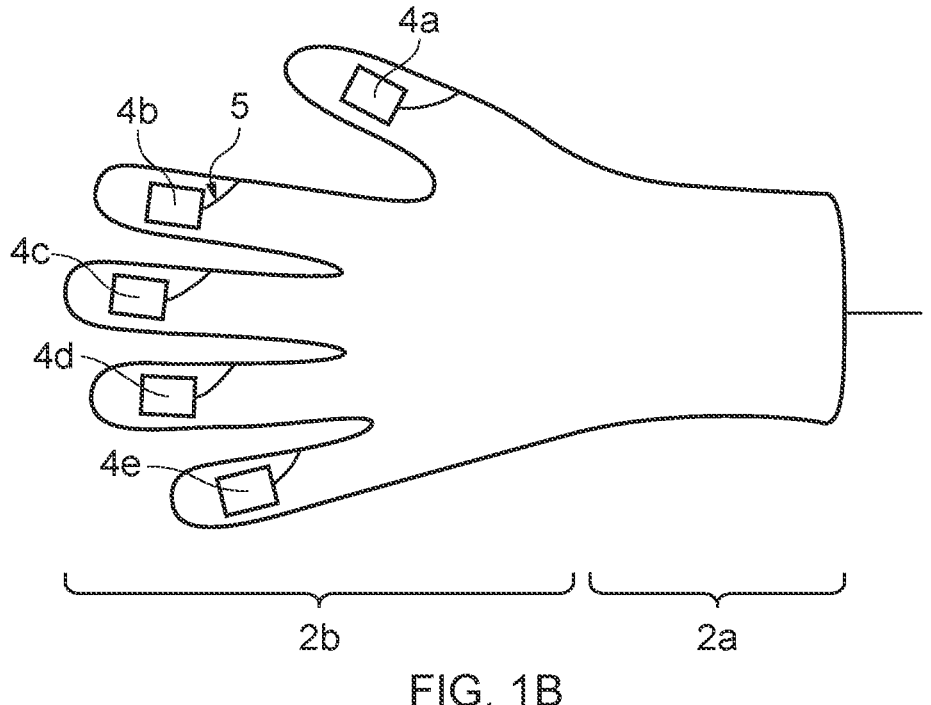
FIG. 1B schematically illustrates an example wearable controller in an assembled configuration.

An aspect of the present disclosure is a device for providing control input. Referring now to the drawings, wherein like reference numerals designate identical or corresponding parts throughout the several views, an exemplary controller device 1 is shown in an assembled configuration in FIGS. 1A and 1B, in front and reverse perspectives respectively.

The example controller device 1 comprises a glove 2 having disposed on its surface a central control circuit 3 connected to contact pads 4. The contact pads 4 are generally connected to the central control circuit 3 via electrical channels 5 present on the glove 2. In use, the user handles the controller 1 by wearing the glove 2 on his or her hands and activates input signals by using the contact pads 4 and the central control circuit 3, to operate controls in an electronic environment.

The controller 1 is generally connected to an external processor of an operable environment—for example, where the external processor is part of (or in communication with) a video game console, the controller 1 can generate an input signal for interacting with a video game environment associated with the console. In other examples, where the external processor is connected to operable machinery, such as a remotely controlled vehicle, the user can operate the controller 1 to generate input to the machinery.

The connection between the controller 1 and external processors is generally achieved through use of the central control circuit 3, wherein the control circuit 3 is connected through a wired or wireless connection to an external processor. In some examples, wireless communication is provided through use of wireless technologies such as Wi-Fi®, Bluetooth® and other near-field communications (NFC). In some examples the wireless communication is provided through use of personal area networks (PANs) which can be provided for example by Bluetooth technology. To this end the central control circuit 3 can comprise a wireless communication unit to allow the controller to wirelessly interact with external processors (such as video game consoles) or other similar controllers. In some examples, the wireless communication unit can be selectively removable and attachable to the garment 2 or circuit 3 (e.g., through use of connectors 6), in a similar manner to the contact pads 4, such that the user can choose the positioning of the wireless signal emitter/receiver for optimal connection. To facilitate a wired connection, the central control circuit 3 can comprise a connection port. The wired connection may for example be via a USB cable. In some example devices the controller can be provided with a communications unit configured to provide and manage connections with external devices and processors. Optionally the role of the control circuit 3 can be shared between a short range wireless transmitter at the garment (such as a Bluetooth transmitter) and a smartwatch running a suitable app that provides the remaining functionality of the controller. The smartwatch may then communicate with the external processor of the operable environment such as the video game console, either directly or via a paired mobile phone.

The example glove 2 is made of fabric and comprises a palm portion 2a configured to be fitted, in use, over a user's palm, and a finger portion 2b extending from the palm portion 2a for fitment over a user's fingers. It can be seen for example in FIG. 1B that in this configuration, a contact pad 4 is present at the extremal ends of each finger.

The electrical channels 5 are configured to connect the contact pads 4 to the central circuit 3. In some examples, the electrical channels 5 are simple wires extending from each pad 4 to the circuit 3, as shown for example in FIG. 1a.

In other examples, the electrical channels 5 can be present on the surface of, embedded in, or integral with, the glove 2. In this example, the electrical channels 5 comprise conductive thread which runs through the glove 2 and can be accessed at conductive points where, referring now also to FIGS. 2A and 2B, connectors 6 can connect contact pads 4 to the glove 2 and provide electrical connection to the channels 5. It will be appreciated that if the control circuit 3 is placed in the palm position on the back of the hand, then the connections can pass round to the palm side. Hence optionally the connections to a default location for the control circuit can include one or more extensions to alternative positions, such as on the opposite side of the garment or for example at a wrist, belt, or broach position, depending on the garment involved.

In some examples, the electrical channels 5 can be replaced with wireless connections between each pad 4 and the central circuit 3. In some examples, the electrical channels 5 can be configured to pass electricity through connectors 6 to provide electrical connection to the contact pads 4.

The contact pads 4 are secured to the glove 2 by connectors 6. In this example, the connectors 6 comprise a patch of hook-and-loop fastening material such as Velcro™. In particular, each contact pad 4 here has at its underside (the surface of the contact pad 4 which is configured to abut the glove 2) a patch of Velcro. The patch comprises hook and/or loop components of the fasten. The glove 2 can be made of a material which is configured to grip the patch on the contact pad 4 to secure it in place. In some examples, the glove 2 comprises patches of Velcro having hook and/or loop components to which the contact pad 4 can be secured. The connectors 6 (i.e. the hook-and-loop material patches in this case) are configured such that the contact pads 4 can be moved around on the glove 2 as desired by the user. In this example, a portion of the hook-and-loop material comprises conductive thread, such that electric current can be picked up from the channel 5 on which the connector 6 is positioned, and passed through to the contact pad 4.

The example device 1 comprises an activation pad 4a generally positioned over the tip of the thumb (part of the glove 2 which, when worn by the user, would fit around his or her thumb) and contact pads 4b, 4c, 4d, 4e generally positioned over the tips of the remaining fingers. All of the contact pads (including the activation pad) can be re-positioned through use of the connectors 6. The contact pads 4b, 4c, 4d, 4e are arranged such that they activate an input signal when they come into contact with the activation pad 4a. The generated signal propagates through the channels 5 to reach the central control unit 3. In some examples which comprise multiple activation pads, the contact pads can produce a different signal depending on the activation pad with which it comes into contact. It will be appreciated that whilst four contact pads are shown, more or fewer may be provided, and positioned where possible according to user wishes. Similarly more than one activation pad may be provided, and may be placed on the thumb or elsewhere (for example on the palm where touchable by a curled finger, or at the base of a finger where touched when in a first configuration).

The central control circuit 3 is configured to receive the signals generated by each contact pad 4 and process the information to be sent to the external processor. The control circuit 3 in this example also comprises an accelerometer unit, configured to measure proper acceleration and detect gestures made by the user. The accelerometer unit is configured to detect particular movements and motions by the user to generate corresponding input signals. These signals are processed on-board the control circuit 3 and sent as appropriate to the external processor, to provide another mode of control for the user.

In use, the user connects the controller device 1 to an external processor of a system to be controlled, through a wired or wireless connection. Wearing the glove 2 on their hand, the user produces certain inputs, by for example pressing the contact pads 4b, 4c, 4e, 4d against the activation pad 4a (or a surface), and/or by making certain gestures picked up by the accelerometer on the control circuit 3. Where the contact pads 4 are used, the generated input signals are sent through the channels 5 to the control circuit 3, where it is processed and sent to the external processor through the wired or wireless connection. Information from the accelerometer unit on the control circuit 3 is also sent to the external processor. In this way, the controller device 1 can generate signals and send them to an external processor to control the system to be controlled by certain movements on the hand.

Generally, each of the contact pads will generate a different signal when pressed or activated. When used for controlling a video game environment, for example, each of the contact pads can be assigned a different button press (i.e., different in-game action). In some examples, the key bindings can be stored on a memory on-board the control circuit 3. The memory can store a number of different profiles relating to the configuration of inputs from the contact pads 4. In some examples, the control circuit 3 is configured to detect the arrangement of the contact pads 4 on the glove 2 and accordingly select, from a pre-configured list of profiles stored on the memory, a profile setting for that arrangement. For example, when the activation pad 4a is placed on the thumb of the glove 2, the control circuit 3 can select a first profile, and when the activation pad 4a is placed at the inner palm of the glove 2, the control circuit 3 can select a second profile. The connectors 6 or channels 5 can optionally be provided with detection points to facilitate this feature.

The glove controller 1 can help people with different problems using a default controller, and also make it easier to map certain entries to different hand movements or places in the glove 1. For example, a user who has a hard time pressing the buttons can use a glove controller where they only need to touch a surface for it to be recognised as the button press. The controller also increases the immersion in games, especially for virtual reality (VR) applications.

Figure 2A:
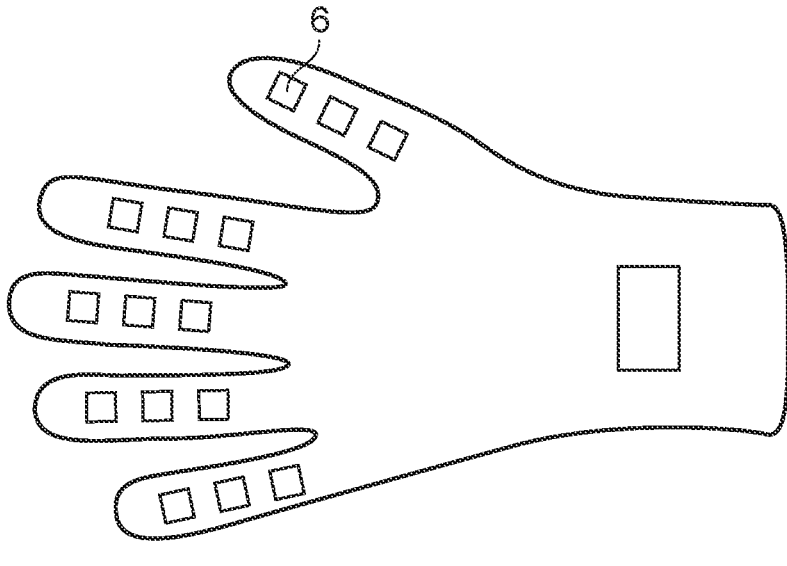
FIG. 2A schematically illustrates an example wearable controller in a partially dissembled configuration.
Figure 2B:
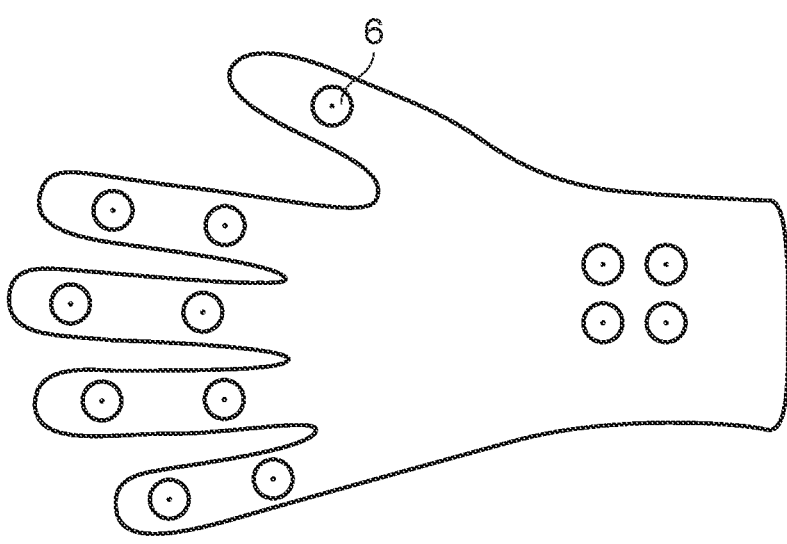
FIG. 2B schematically illustrates an example wearable controller in a partially dissembled configuration.

Whilst in some cases the controller 1 can be configured such that the contact pads 4 can be secured to any part of the glove 2 (e.g., by having the glove 2 made entirely or mostly out of a Velcro-receptive material), in other cases, the glove 2 can be provided with an arrangement of connectors 6. FIGS. 2A and 2B schematically illustrate examples of controllers having specific points at which the contact pads 4 can be attached.

In FIG. 2A, the controller comprises multiple Velcro pads which provide points at which corresponding materials can be temporarily secured. In this way, a hook-and-loop fastening can be made as described above, and the user can place the contact pads at any one of these locations.

In FIG. 2B, the controller comprises multiple rivets which make up half of a snap fastener, as the connector 6. The contact pads 4 comprise buttons which are configured to fit with the rivets on the controller. The contact pads 4 can be placed in any position where the snap fasteners are present. Each component can be secured by one or more snap fasteners.

Figure 3:
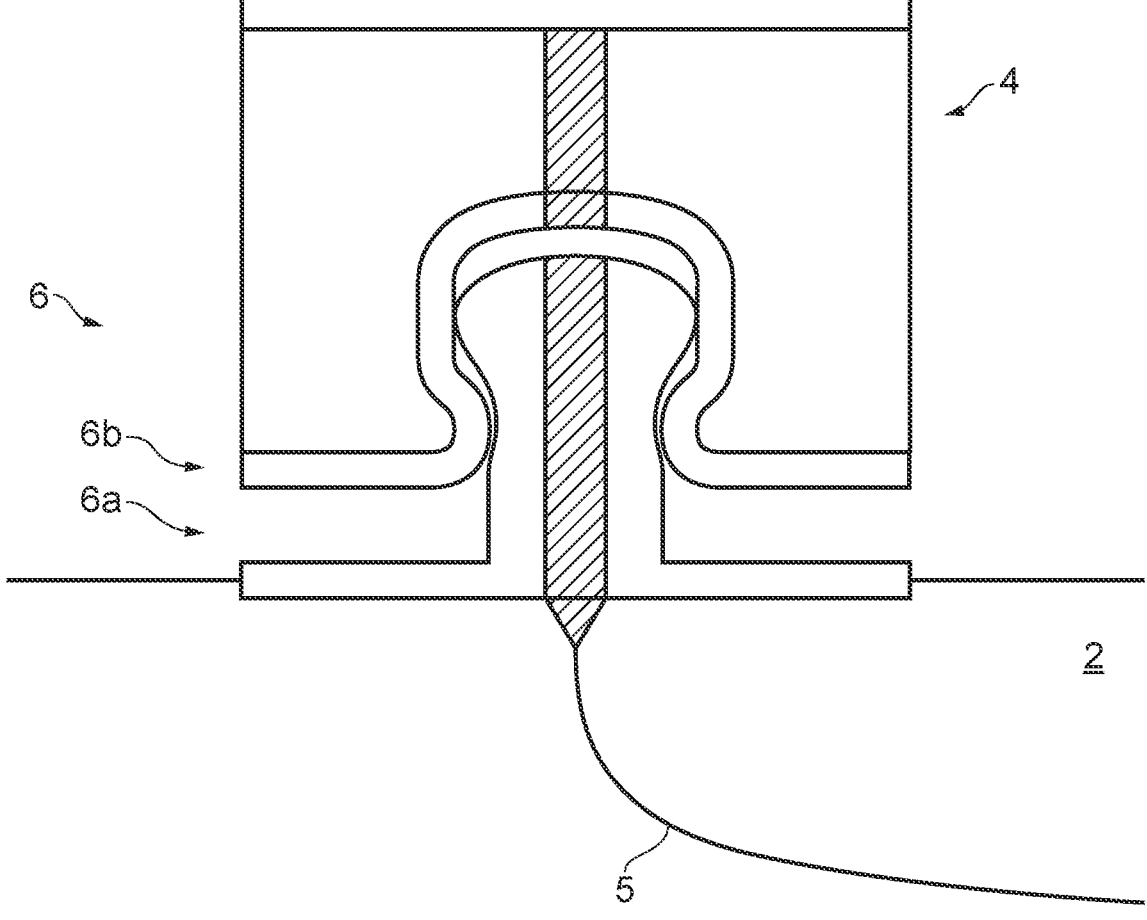
FIG. 3 schematically illustrates a cross-sectional view of an example connector.

In some examples, the snap fasteners can provide electrical connectivity to the electrical channels 5. FIG. 3 schematically illustrates a cross sectional view of an example snap fastener acting as a connector 6. The snap fastener comprises a protrusion 6a and a groove 6b which is complementary to the protrusion. In use the connection is made by pressing the protrusion 6a into the lipped groove 6b such that the protrusion 6a fits within the groove and is held in place by the lip of the groove 6b. In this example, the protrusion 6a is present on the garment 2 and is connected to the electrical channel 5 present on the garment 2. The protrusion 6a comprises a conductive part which runs through its centre and connects a surface of the protrusion 6a to the electrical channel 5. The groove 6b is present on an underside of the contact pad 4 (or other component such as control circuit 3) and comprises a conductive part which connects the working parts of the contact pad 4 to an inner surface of the groove. In this way, when the protrusion and groove are placed in contact, an electrical connection is established between the contact pad 4 and the electrical channel 5 (and therefore to the control circuit 3, for example) without exposing electrical current to an outer surface of the connector 6. In other examples, the conductive parts of the groove and protrusion can be provided at the lips where contact is strongly maintained. In yet further examples, the placement of the protrusion and groove can be reversed—i.e., the groove positioned at the garment 2 and the protrusion positioned at the contact pad 4. A similar concept can be applied to provide insulated electrical connectivity for Velcro or other hook-and-loop connections, for example by using conductive thread embedded in the centre of the hook-and-loop patches.

In some examples, two different kinds of connector 6 can be employed, with one kind configured to connect a first type of contact pad to the garment and another kind configured to connect a second type of contact pad to the garment, to encourage users to arrange the pads in a certain way.

Whilst in some of the above examples, various controllers have been described with contact pads and control circuits on gloves, it will be appreciated that other examples using different types of garments other than gloves—such as shirts, shoes, arm band, hats—can equally be used.

Figure 4:
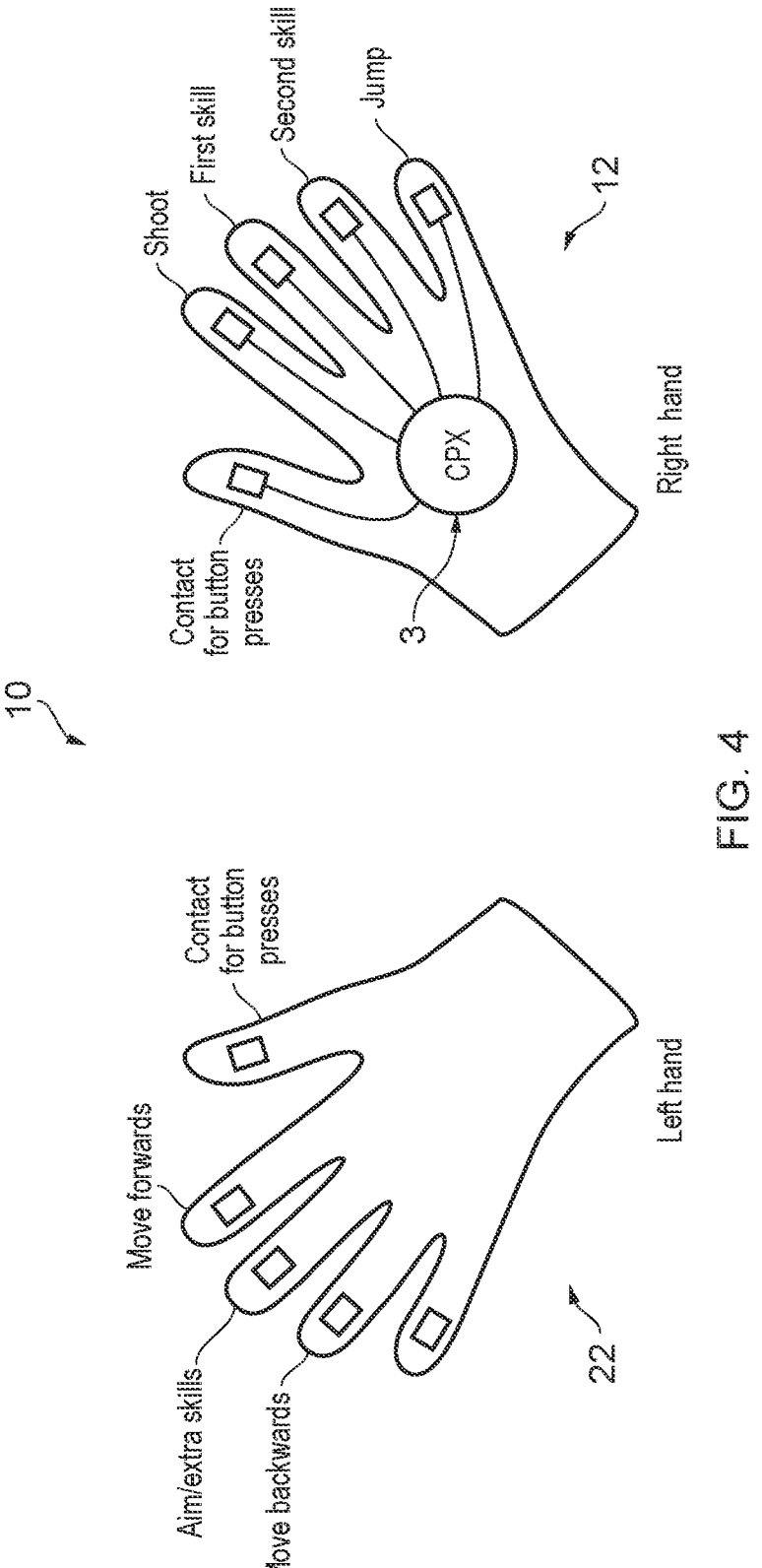
FIG. 4 schematically illustrates an example wearable controller in an assembled configuration

In some examples, the various components of the controller can be distributed across multiple garments. For example, FIG. 4 schematically illustrates a wearable controller 10 comprising a first glove 12 and a second glove 22. Each glove comprises a number of contact pads 4 which are configured in a similar manner as those described with respect to FIGS. 1A and 1B. In this example, the first glove comprises a central controller circuit 3. Each of the contact pads 4, both on the first glove 12 and the second glove 22, are connected to the contact pads 4. On the first glove, the contact pads 4 can be directly connected in the manner described above. On the second glove, the contact pads 4 can also be connected to the central controller circuit 3, through wired connection. However, wireless communication is preferred across the two gloves. In this example, the contact pads on the second glove are in direct wireless communication with a communication unit on the central control circuit 3. In other examples, the contact pads on the second glove can be connected to a communications unit on the second glove, which is configured to wirelessly send signals from the second glove to the control circuit 3 on the first glove. The contact pads on the second glove can be connected to each other and/or to the communications unit by conductive channels 5.

Whilst FIG. 4 illustrates the idea using two gloves, it will be appreciated that any combination of other garments, particularly those mentioned herein, can be made. For example, the device can comprise an arm band as the first garment and a shirt as the second garment.

It will be appreciated that where in the above description reference has been made to contact pads 4 and activation pad 4a, and that inputs are achieved by contact between a contact pad and an activation pad, then as also described previously herein alternatively or in addition any pad may still be arranged to generate an input independently based on pressure, either by use of a switch or a capacitive or resistive sensor or similar as described elsewhere herein. In this way the user can generate inputs by pressing such a pad on any surface, including other parts of the garment. In this case, optionally contact between two pads (or specifically a contact pad and an activation pad) may still be detected as a distinct input type. Hence more generally 'contact pads' may refer to any type of pad herein, and include pads that operate independently, or in conjunction with another pad, or both.

It will also be appreciated that where pads are connected via a wired connection to the control circuit, the wires may or may not be woven or otherwise integrated into the glove. If loose, then optionally the glove or other type of garment may comprise an inner layer and a removable outer layer; the pads may be configured on the inner layer, and then the loose wiring may be covered by replacing the outer layer of the garment.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A wearable controller, the controller comprising:
a garment including a plurality of connection points;
a set of pads detachably secured to the garment, each pad of the set of pads being attached to a respective connection point of the plurality of connection points, the set of pads including:
one or more contact pads; and
one or more activation pads for activating the one or more contact pads; and
a programmable central controller circuit that is operable to:
determine an arrangement of the set of pads on the garment, including:

identifying first connection points of the plurality of connection points that are attached to a contact pad;

identifying second connection points of the plurality of connection points that are attached to an activation pad; and select, from a plurality of selectable profiles and based on the arrangement of the set of pads on the garment, a particular profile that assigns pairs of contact pads and activation pads to generate an input when in contact with one another, wherein the one or more contact pads are each electrically connected to the central controller circuit through the respective connection points, and are operable to generate input signals in response to user action, such that an input signal is registered by the central controller circuit only when a contact pad contacts a paired activation pad identified by the particular profile.

2. The wearable controller according to claim 1, wherein the plurality of connection points comprise hook and loop fabric fasteners.

3. The wearable controller according to claim 1, wherein the plurality of connection points comprise snap-fit fasteners.

4. The wearable controller according to claim 1, wherein the one or more contact pads comprise conductive fabric.

5. The wearable controller according to claim 1, wherein the one or more contact pads are connected to the central controller circuit by conductive threads.

6. The wearable controller according to claim 1, wherein the garment is a glove comprising a palm portion and at least one finger portion, and the central controller circuit is positioned on the palm portion.

7. The wearable controller according to claim 1, wherein the one or more contact pads comprise capacitive touch pads.

8. The wearable controller according to claim 1, wherein the central controller circuit is detachably secured to the garment via one or more connectors.

9. The wearable controller according to claim 1, further comprising an accelerometer connected to the central controller circuit for registering motion, tilt, and/or rotation of the controller.

10. The wearable controller according to claim 1, wherein the garment comprises at least one conductive channel on its surface, configured to electrically connect, in use, the central controller circuit with the plurality of connection points.

11. The wearable controller according to claim 10, wherein the at least one conductive channel is formed of conductive thread embedded in the garment.

12. The wearable controller according to claim 1, further comprising:

a second garment; and a second set of contact pads detachably secured to the second garment, wherein the second set of contact pads are connected to the central controller circuit and are operable to generate input signals in response to user action.

13. The wearable controller according to claim 1, wherein the central controller circuit is operable to store the plurality of selectable profiles, each profile corresponding to a respective arrangement of pads.

14. The wearable controller according to claim 1, wherein the user action causes one of the one or more activation pads to contact one of the contact pads.

15. The wearable controller of claim 1, wherein the central controller circuit is operable to:

receive, from a contact pad of the one or more contact pads, an input signal generated in response to the contact pad contacting a paired activation pad identified by the particular profile; and in response to receiving the input signal, executing an action in a virtual environment.

16. The wearable controller of claim 1, wherein the first connection points combined with the second connection points comprise the plurality of connection points.

17. The wearable controller of claim 1, wherein the first connection points combined with the second connection points comprise a subset of the plurality of connection points.

18. The wearable controller of claim 1, wherein the central controller circuit is operable to:

in response to detecting attachment or detachment of at least one pad, determining an updated arrangement of the set of pads on the garment; and selecting, from the plurality of selectable profiles and based on the updated arrangement of the set of pads on the garment, a second particular profile.

* * * * *